United States Patent [19]

Berenbaum et al.

[11] Patent Number: 4,484,274
[45] Date of Patent: Nov. 20, 1984

[54] COMPUTER SYSTEM WITH IMPROVED PROCESS SWITCH ROUTINE

[75] Inventors: Alan D. Berenbaum, Summit, N.J.; Anand Jagannathan, Hopkinton, Mass.; John J. Molinelli, Fair Haven; Steven P. Pekarich, Eatonton, both of N.J.

[73] Assignee: AT&T Bell Laboratories, Murray Hill, N.J.

[21] Appl. No.: 415,732

[22] Filed: Sep. 7, 1982

[51] Int. Cl.³ .............................................. G06F 9/00
[52] U.S. Cl. .................................................... 364/200
[58] Field of Search ......................... 364/200 MS File

[56] References Cited

U.S. PATENT DOCUMENTS 3,614,742 10/1971 Watson et al. ...................... 364/200

*Primary Examiner*—Raulfe B. Zache
*Attorney, Agent, or Firm*—Herbert M. Shapiro

[57] ABSTRACT

Process switch operations common in multiprogramming environments in commercially available data processors, are carried out faster herein by providing a decision-making capability for determining whether only a subset or all of the usually saved data actually is to be saved each time a process switch operation is called for. Both hardware and software implementations are disclosed.

5 Claims, 33 Drawing Figures

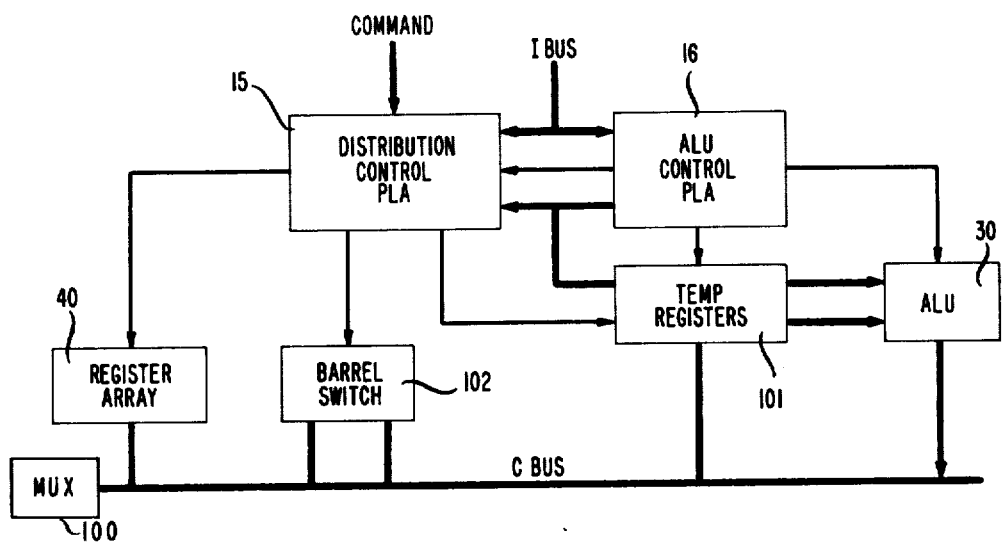
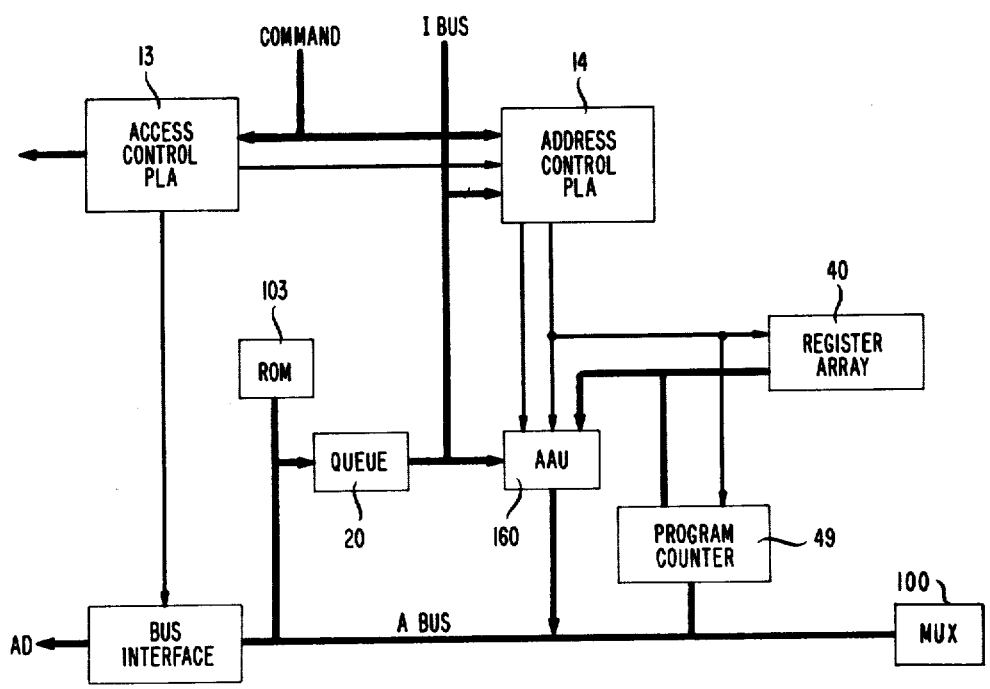

FIG. 8
FIG. 6
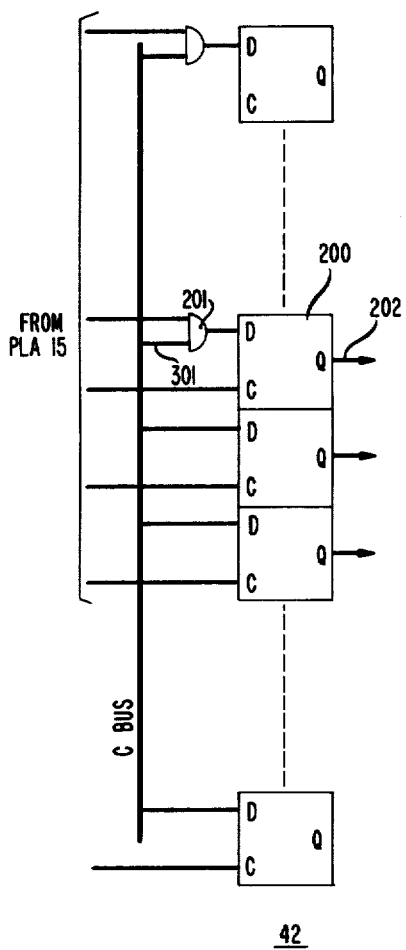
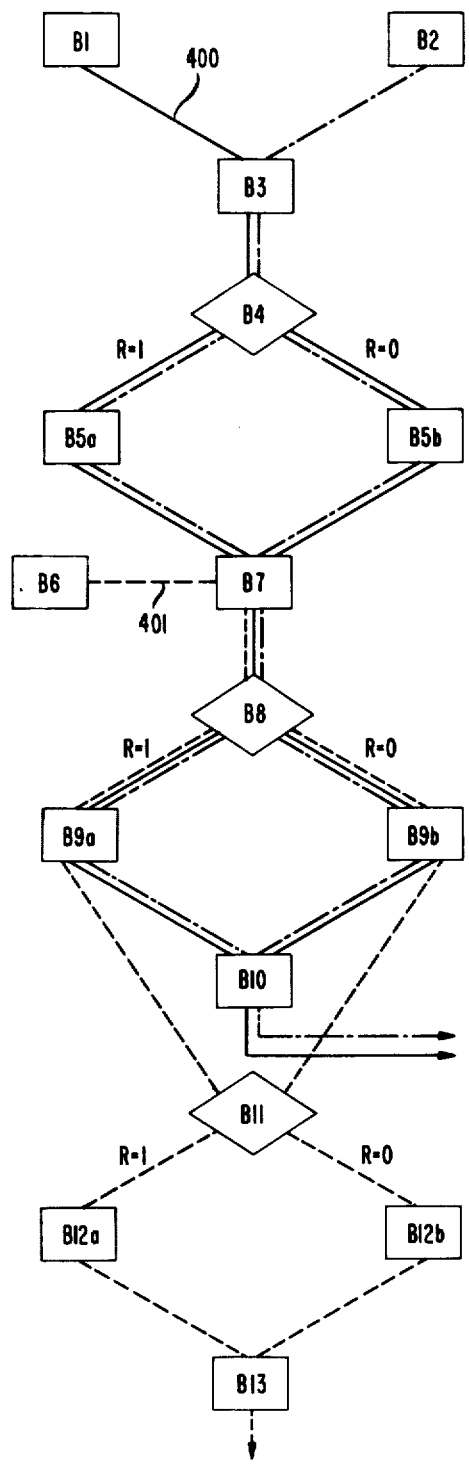

COMPUTER SYSTEM WITH IMPROVED PROCESS SWITCH ROUTINE

FIELD OF THE INVENTION

This invention is directed to a data processing system and, more particularly, to a system for carrying out context (or process) switch operations in a multiprogramming environment.

BACKGROUND OF THE INVENTION

We will adopt the convention that the term "program" defines a stream of both instructions and data that a user can request an operating system to transfer, link, and execute. An "executable" program in memory is called an "image". The (hardware) context in which an image is executed is called a "process" and the term "process" thus characterizes the complete unit of execution in the computer system.

A context (or process) switch operation can be understood to occur in a multiprogramming environment where several processes (individual streams of code) are ready for execution at any one time. The term "process switch operation" thus refers to the procedure for reassigning the processor from a currently running process to a successor process.

In order to achieve a high performance system, a processor has to be structured to enable the operating system to switch execution rapidly between individual processes. Since a process is a stream of instructions and data defined by a hardware context, each process has a unique identification in the computer system, the stream of code being executed at any instant being determined by its hardware context. The term "hardware context" refers to the information loaded in the processor's registers that identifies, where the stream of instructions and data are located, which instruction to execute next, and what the processor status is during execution. In an illustrative prior art system (Digital Equipment Corporation VAX-11 computer) the computer's operating system switches between processes by requesting the processor to save one process hardware context and load another via a specific set of instructions.

In a microprocessor, process switch operations are controlled on-chip. Specifically, a microprocessor typically includes one or more programmed logic arrays (PLAs) each with word lines along which a pattern of transistors are defined in a manner determinative of output codes operative to control various other elements of the microprocessor. The pattern of transistors along each word line is called "microcode", the totality of microcode lines defined by a PLA being referred to as a "microprogram". Each word line, specifically, defines a particular set of output bits representative of a line of microcode. Sequences of microcode instructions are generated at the output register of the PLA and applied to various registers, inter alia, to control data flow and processing on the chip, often responsive to a single instruction at the input to the PLA.

An input instruction to a PLA is referred to as an "opcode", a sequence of such instructions being referred to as "macrocode". It is common during operation for instructions to be introduced to the chip from a memory which is external to the chip. Such instructions often are latched in an on-chip instruction register for processing under the control of the PLA. A "process switch operation", in this context, is controlled by a sequence of microcode instructions generated at the output register of a PLA.

When a process switch operation occurs in a prior art system, the processor operates in two phases: the first phase is to save (store) the current state of the interrupted process for resumption at a later time. The second phase is to set up (restore) the new state for the successor process. At the conclusion of the successor process, the processor operates to re-establish the state of the previous (or some other) process.

The steps carried out in response to a process switch command in prior art systems are summarized in Table I as follows:

TABLE I

| | | |
|---|---|---|
| 1. | save SP, PC, and PSW registers of current process | STORE |
| 2. | save general purpose registers of current process | |
| 3. | set up SP, PC and PSW registers for new process | RESTORE |
| 4. | set up general purpose registers for new process | | where "SP" stands for stack pointer, "PC" stands for program counter, and "PSW" stands for process status word. The problem which this invention addresses is that an excessive amount of processor time is spent on the overhead associated with managing a plurality of processes in general and on process switch operations in particular. The need to shorten that time is particularly apparent for multiuser timesharing computer systems where noticeable waiting periods are encountered by users, due to the time the processor spends on process switches.

BRIEF DESCRIPTION OF ILLUSTRATIVE EMBODIMENTS OF THE INVENTION

It has been realized that, under certain circumstances, steps 2 and 4 of Table I are unnecessary and often result in an unproductive use of machine time. A processor using the principles of the invention consequently includes means responsive to a request for a process switch operation for deciding whether steps 1, 2, 3 and 4 are to occur as described above or whether just steps 1 and 3 are to occur in each instance. In particular, each process includes means for controlling whether or not steps 2 and 4 are to occur when the process is moved to memory during a process switch operation and the processor is designed to respond to this control. Significant improvement in the (average) time required to perform a process switch operation is achieved as a result.

In one embodiment, an R bit is added to the PSW register and additional hardware is included in the data path portion of the microprocessor for testing the value of that bit. The additional hardware is operative in cooperation with a microprogram stored in on-chip ROM (read only memory) to interconnect means responsive to a process switch command for instructing a PLA to execute the desired operation. In an alternative embodiment, the process switch operation is accomplished by a second microprogram in the absence of additional hardware. The microprogram, in this instance also, is stored in ROM and is responsive, for example, to macrocode via an instruction register (and PLAs) for executing an operation.

BRIEF DESCRIPTION OF THE DRAWINGS

FIGS. 4 and 5 are schematic representations of the organization of the microprocessor of FIGS. 2 and 3;

FIGS. 6 and 7 are circuit schematics of portions of the microprocessor of FIG. 1;

FIG. 8 is a flow diagram of the operation of a portion of the microprocessor of FIGS. 1, 2 and 3;

FIG. 33 is a block diagram of the relationship between FIGS. 1, 2 and 3.

DETAILED DESCRIPTION

Figure 1:
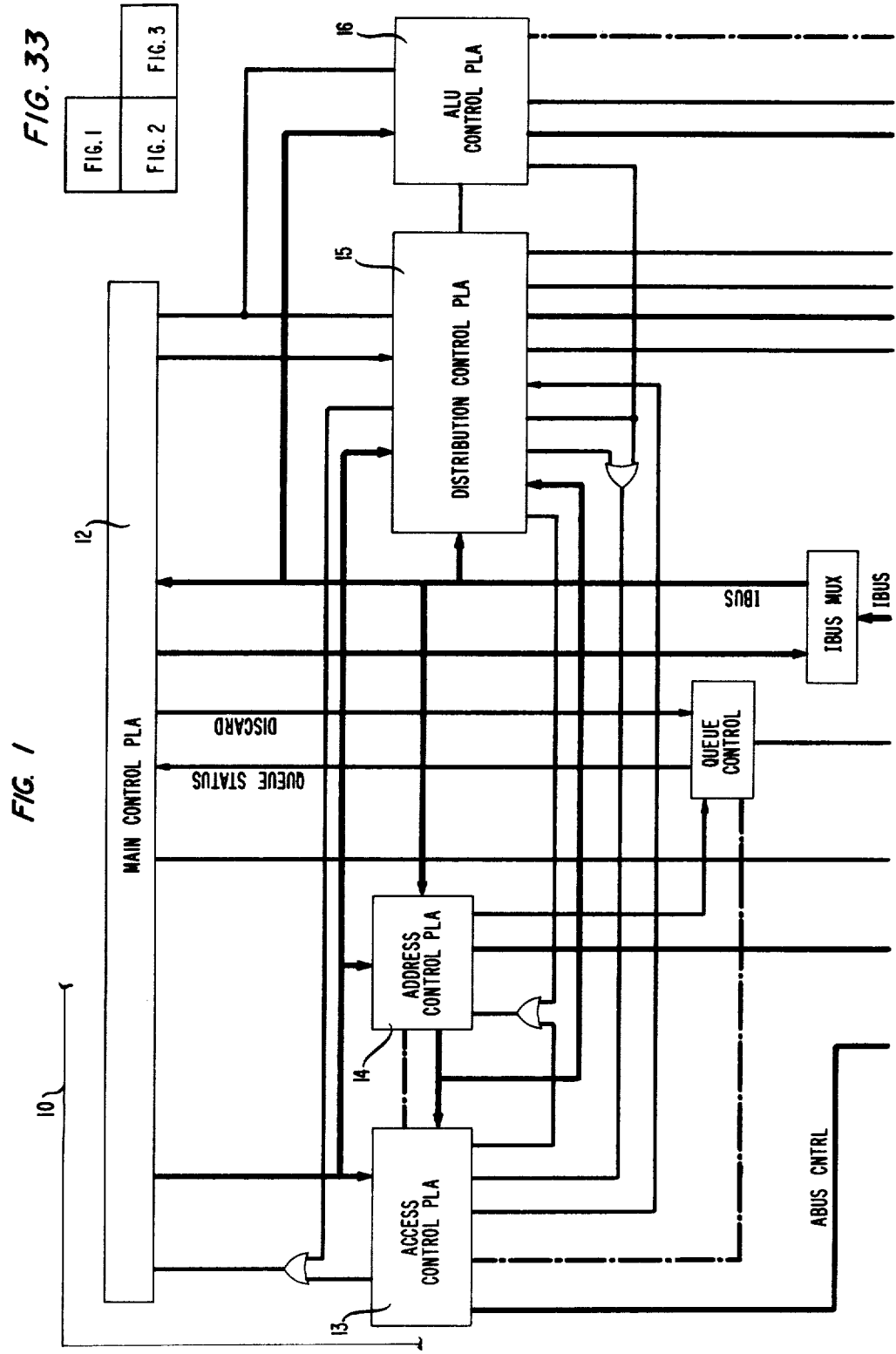
FIGS. 1, 2 and 3 are block diagrams of an illustrative semiconductor microprocessor chip.
Figure 2:
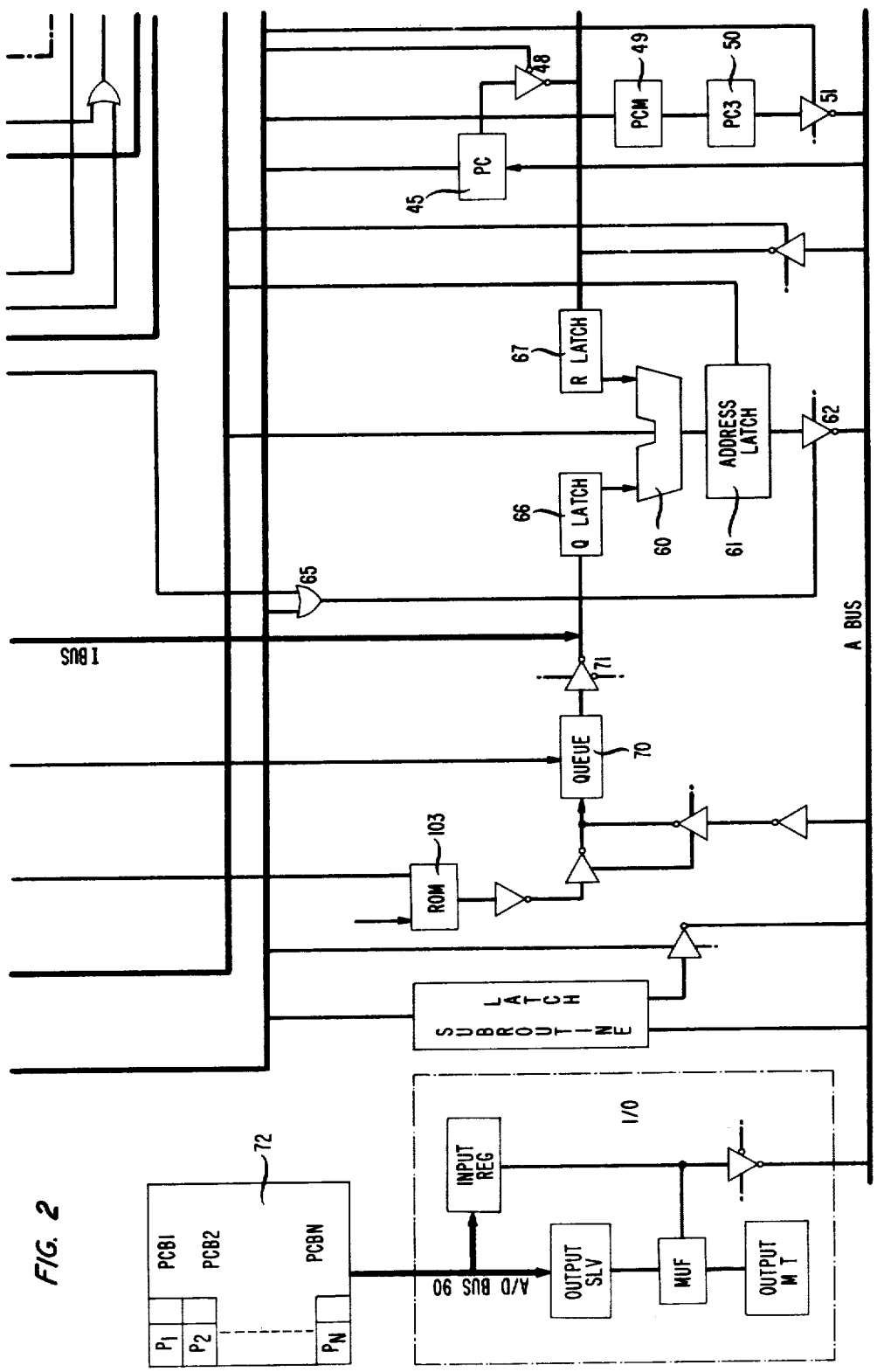
Figure 3:
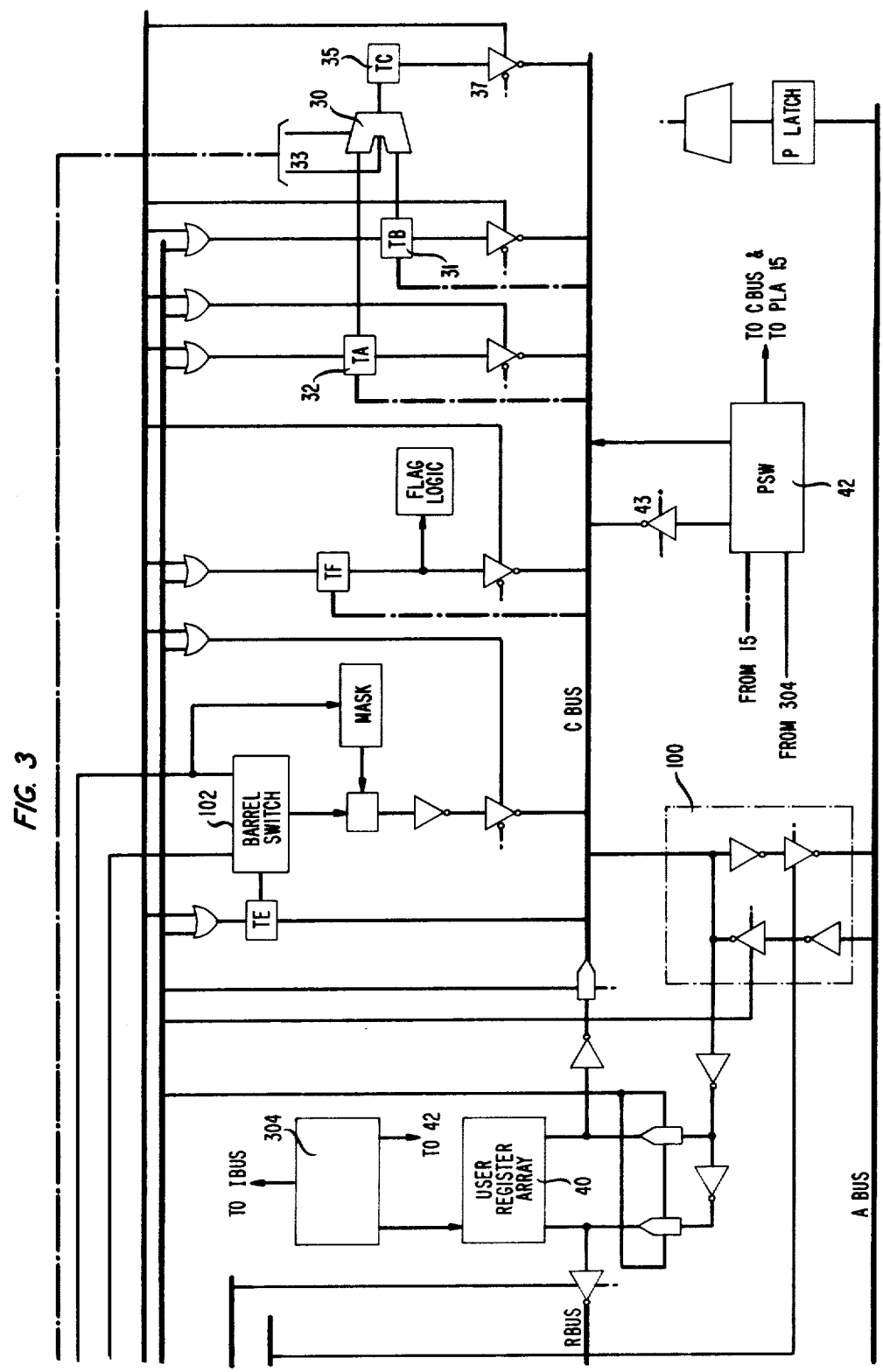

FIGS. 1, 2 and 3 show a block diagram of a semiconductor microprocessor chip 10. The chip has defined in it a plurality of programmable logic arrays (PLAs) represented by blocks 12, 13, 14, 15 and 16. The various PLAs are interconnected into a control hierarchy in accordance with the teachings of copending application Ser. No. 233,107 filed Feb. 10, 1981 for D. E. Blahut, M. L. Harrison, M. T. Killian and M. E. Thierbach. The blocks are labeled according to function as MAIN control, ACCESS control, ADDRESS control, DISTRIBUTION control and ARITHMETIC logic unit (ALU) control, respectively. The various PLAs are interconnected to interact with one another to control the operation of the data path portion of the chip as is described more fully hereinafter.

The data path portion of the chip comprises the elements which carry out operations on data from memory. The data path typically includes user registers, temporary registers, an arithmetic logic unit (ALU), address arithmetic unit (AAU), counters, etc. The organization of the data path and the interconnection of the data path and control portions of the microprocessor are now discussed as a basis for an illustrative operation.

The data path portion of chip 10 includes specifically, an ALU 30 along with two temporary registers 31 and 32 (TA and TB) as shown in FIG. 3. The outputs of the registers are connected to inputs to the ALU. The ALU carries out operations on data applied by the registers to the ALU according to the microcode applied to the ALU from the ALU control PLA over lines represented by symbolic line 33. The output of the ALU is applied to temporary register 35 to be applied to the "C-BUS" by means of tri-state buffer 37. The data in the temporary registers originates from selected ones of user registers 40 or from memory locations.

A PSW (process status word) register 42 is connected to the C-BUS via a tri-state buffer 43. The PSW register is a special purpose register that a program uses to check its status and to control synchronous error conditions. The process status word contains two sets of bit fields, the condition codes and the trap enable flags similar to those described in the *VAX* 11-780 *Hardware Handbook*, 1978 edition by Digital Equipment Corporation on page 43, et. seq.

A program counter (PC) 45 of FIG. 2 is connected between the A-BUS at its input and the output of the access control PLA 13. The output of the program counter is connected to the R-BUS via tri-state buffer 48. The output of PLA 13 also is connected to the gate input of buffer 48. A program counter master latch 49 is connected between the output of the program counter and the A-BUS. The output of latch 49 is connected to the input of a slave latch 50. Slave latch 50 is connected to the A-BUS via a tri-state buffer 51. The gate input to buffer 51 is connected to the output of Access Control PLA 13. Program counter 45 contains the address of the next instruction to be executed as described on page 41 of the above-mentioned VAX-11 handbook and permits a programmer to write position independent code as is well understood in the art.

An Address Arithmetic Unit 60 and associated address latch 61 are connected serially between the output of Address Control PLA 14 and the A-BUS via tri-state buffer 62. The tri-state buffer gate input is connected via AND circuit 65 to the output of PLA 13. Another input to circuit 65 is connected to the output of distribution control PLA 15. Outputs from Q latch and R latch 66 and 67, respectively, are connected to inputs to ALU 60. Queue 70 applies its output to latch 66 via tri-state buffer 71 and, via the IBUS, to instruction registers (latches) at the inputs to MAIN, ADDRESS, and DISTRIBUTION PLAs 12, 14 and 15. Each of the outputs represents an opcode from the macroprogram stream. Latch 67 accepts data from a selected user register. The AAU forms the address of the operand from the two inputs.

The microprocessor is operative to execute operations in ALU 30 under control of ALU control PLA 16 on data determined and organized by PLAs 14 and 15. Distribution PLA 15 controls the A- and C-BUS multiplexer 100 by controlling the data path from memory and the address arithmetic unit controls the loading of data into temporary registers 31 and 32 via output buffer 62 if the AAU result represents data (not an address). PLA 16 controls the ALU operation. The access control PLA 13 performs access of memory 72 using addresses formed by AAU 60 under control of PLA 14 under the control of MAIN PLA 12 as described in the above-mentioned patent application of Blahut et al.

The foregoing portion of the microprocessor is commonly referred to as the "Execute" unit and is shown in more simplified block diagram form in FIG. 4. Data from memory are stored selectively in user register array 40 via the A-BUS and A- and C-BUS multiplexer array 100. Data are moved to the temporary registers 31 and 32 of FIG. 3 shown collectively as 101 in FIG. 4 via a barrel switch 102 described in a copending application for S. M. Kang and R. H. Krambeck Ser. No. 221,777 filed Dec. 31, 1980.

The remainder of the data path operates as the fetch unit. That is to say, PLAs 13 and 14 of FIG. 5 control the movement of instructions (opcode) and data from memory. Data is moved to user registers or other destinations on chip; opcodes go to the queue 70. Program counter 49 increments to point to the next memory address. AAU 60, which contains an adder, controls more complex address changes as is well understood.

Memory 72 stores a number of processes in association with process control blocks. The processes are designated $P_1, P_2 \ldots P_n$ and the associated process control blocks are designated PCB1, PCB2 ... PCBM. The process control block contains all of the switchable process information collected into compact form for ease of movement to and from the internal (user visible) registers as described in the above-noted *VAX-11 780 Hardware Handbook* starting on page 59.

When a process switch command is moved from memory to queue 70 as part of a program, command signals are applied to MAIN control PLA 12 which recognizes the command as a process switch instruction. Read only memory (ROM) 103 includes a set of process switch instructions to be applied to PLA 12 for organizing the operation of the processor for carrying out the process switch operation. Those instructions are in addresses in ROM and are accessed by PLA 12 in response to the signals applied to PLA 12. The instructions are included in a computer program along with comments identified as Appendix A herein. The program is a fragment written in a form of assembly language similar to that used with the above-mentioned VAX computer. Sufficient comments are provided to enable one skilled in assembly languages to understand the fragment.

A process control block pointer (PCBP) is located in one of the user registers 40. When a signal occurs to indicate a process switch instruction, the PCBP is changed from that of the current process to that of the new process. While a process is running, the stack pointer (SP—located in one of the user registers of array 40), the program counter (PC), the process status word (PSW) and the general purpose registers contain data which are typically updated on each cycle of operation of the microprocessor. These elements thus contain data which represent the instantaneous state of the process. When a process switch operation is called for, main control PLA 12 performs operations which copy the data in the PC, the SP and the PSW registers into the PCB (in memory) of the currently running process. Whether or not the data in the general registers is to be copied into the PCB of the currently running process is determined by the "R" bit in the PSW. Specifically, during a process switch operation, the R bit in the PSW is used, and possibly modified, in a manner to control the copying of the contents of the general purpose registers into the PCB.

The fetch unit operates in the traditional mode to fetch data and instruction from memory 72. That is, when a program which is being executed currently calls for instructions or data or both from memory, PLAs 12, 13 and 14 operate to access the corresponding addresses in memory and to apply the contents of the address (or sequence of addresses) to the address and data BUS 90 for storage in queue 70. Data are also moved along the A-BUS and via the multiplexer 100 to the C-BUS for storage in user register 40 or in temporary registers 31 and 32. As the instructions are executed, program counter 49 is incremented in the usual fashion under the control of address control PLA 14. When the program calls for a subroutine stored in ROM 103, address control PLA 14 responds to clear the queue and to move the contents of the corresponding addresses in ROM to the queue for execution.

On each occasion that the program calls for a process switch operation, the memory block, say P2 of FIG. 1 representing the new process is accompanied by a process control block, say PCB2 of FIG. 1. The process control block includes data for reorganizing the hardware for providing the necessary context for the new process—all the data needed to load the processor's programmable registers when a process switch operation occurs. Each time a process switch operation occurs, the operating system loads the processor's process control block base register (PCBP) with the address of a process control block and issues a process switch instruction.

Figure 7:
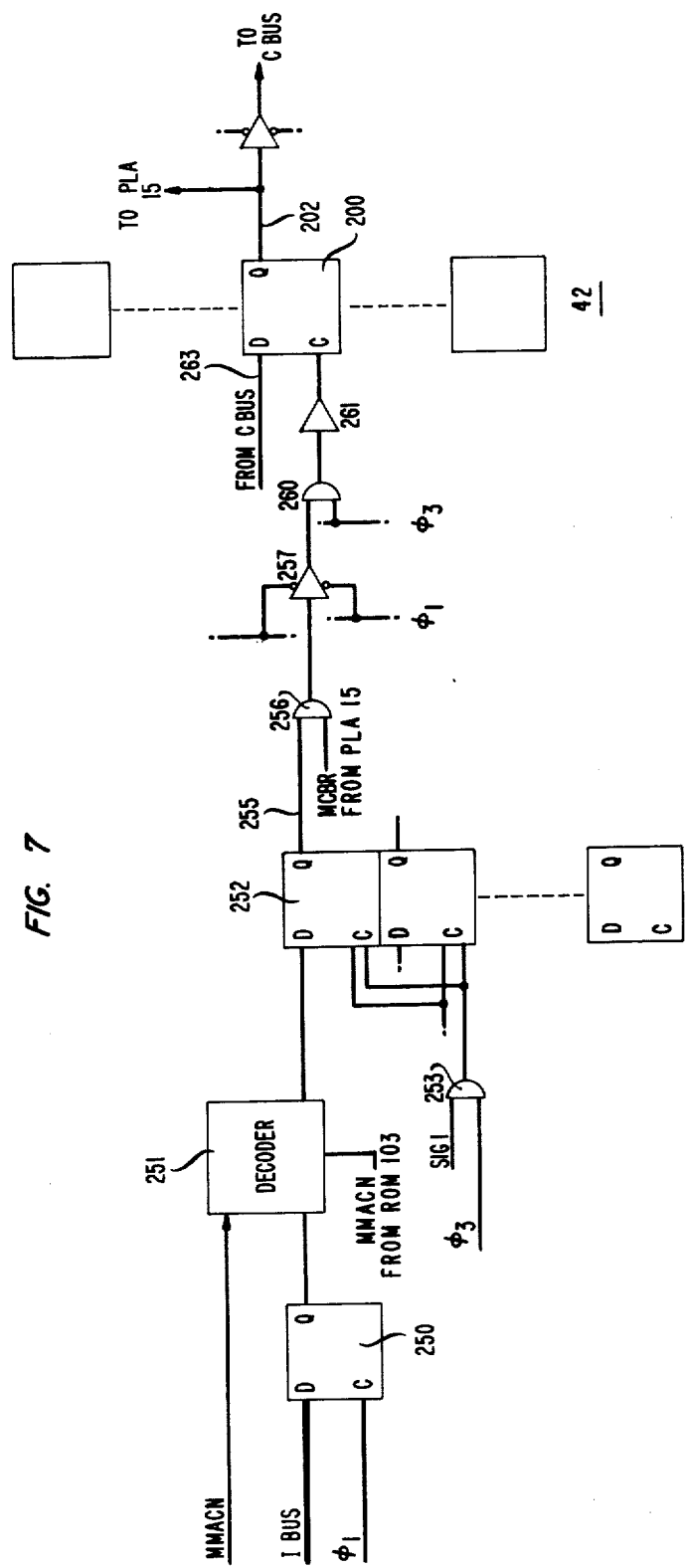

FIGS. 6 and 7 show hardware added to a microprocessor for determining the value of the R bit in the process status word (PSW). The hardware is operative with the program of Appendix A. Specifically, FIG. 6 shows the PSW register 42 including a latch 200. Data from a selected process control block (i.e., PCB2) in memory 72 is applied in parallel to the data input (D) of the latches of the register via the C-BUS as indicated in the Figure. Appropriate timing is applied to the clock input (C) of the latches of the register by the distribution control PLA 15. An OR circuit 201 is provided with inputs connected to the C-BUS and to outputs from PLA 15.

The output (Q) 202 of latch 200 is connected to the C-BUS and to an input to PLA 15. The former connection is for storing the bit, along with others of the PSW, in the current PCB reflecting the instantaneous status of the current process. The latter connection is for the purpose of reading the R bit and for making a decision. The organization and operation of the illustrative embodiments herein are consistent with the description in the abovenoted *VAX-11 780 Hardware Handbook* with the exception that an R bit is added and that a decision is made on the basis of that bit as to the disposition of the contents of the user registers 40 when a process switch operation occurs.

FIG. 7 shows the logic circuitry associated with using the R bit (latch 200). The IBUS is connected to the data inputs of 8-bit latch 250. The c inputs to the latch are connected to the $\phi_1$ output of the clock (not shown). The output (Q) of latch 250 is connected to an input of decoder 251. The output of ROM 13 of FIG. 2 is connected to a second input of decoder 251. The output of decoder 251 is connected to the data (D) inputs to 8-bit latch 252. The output of AND circuit 253 is connected to the clock inputs of latch 252. The inputs to AND circuit 253 are connected to the $\phi_3$ clock output of the clock circuit and to the output of MAIN PLA 12 for receiving signal SIG-1.

The outputs of latch 252, are represented by conductor 255, are connected to inputs to AND circuits as represented by AND circuit 256. A second input of AND circuit 256 is connected to the output of distribution PLA 15. The output of AND circuit 256 is connected to the input to latch 257. Latch 257 is a tristatable clocked buffer having a floating output except during phase $\phi_1$.

The output of latch 257 is connected to one input of AND circuit 260. The $\phi_3$ output of the clock circuit is connected to a second output of circuit 260. The output of circuit 260 is connected to the input of buffer 261. The output of buffer 261 is connected to the clock input (c) of latch 200. Line 263 connects the C-BUS (FIG. 3) to the data input of latch 200. The output (202) of latch 200 is connected to the C-BUS (FIG. 1) via bus drivers and to PLA 15.

In operation, the data on the IBUS is latched onto latch 250 by clock signal $\phi_1$. The content of latch 250 is decoded along with signal MMACN, a ROM-ON signal which indicates that code is being executed out of ROM 13. If the content of latch 250 and signal MMACN indicates that an R bit reference is desired, the signal MRBR (the R bit reference signal) is asserted, as shown, at the output of decoder 251.

Signal MRBR is latched by signal SIG 1 from MAIN PLA 12 enabled by clock signal $\phi_3$. SignaL MCBR indicates that a data value is to be written from the C-BUS into a register. The resulting bit of the signal on line 255 is combined with signal MCBR from distribution PLA (15). The resulting signal is delayed to phase $\phi_1$ at latch 257. At a following phase $\phi_3$, if the output of latch 257 is high, the corresponding data bit on the C-BUS is latched into the R bit latch 200 of PSW register 42.

FIG. 8 shows a flow chart of the sequence of operations when a process switch operation is invoked in the ordinary sequence of events. This process switch operation may be invoked by several means, three of which are illustrated in FIG. 8. A CALL PROCESS (CALLPS) instruction causes one (current) process to be suspended and a new process to be initiated on the processor. Block B1 in the Figure represents the initialization of the sequence. This includes storing the PCBP of the current process in the interrupt stack. The register array 40 of FIG. 2 includes an interrupt stack pointer which supplies the memory location for storing the PCBP.

Block B3 represents the action where the R bit of the new process is copied into the R bit of the current PSW. In addition, the contents of the program counter, the PSW and the SP are stored into the PCB (process control block) of the current process. A PCBP register contains the pointer to the proper PCB.

Block B4 represents the evaluation of the R bit of the current process when the process switch operation occurs. If the bit is a binary 1, the contents of the user registers R0 through R10 are stored in the PCB as indicated in Block B5a. If the bit is a binary 0, no action is taken (Block B5b).

Next, a new PCBP, supplied by the call process instruction, is loaded and the PC, SP and PSW registers are loaded from the PCB of the new process as indicated at block B7.

The R bit is evaluated again at this juncture as was described above in connection with block 4. This evaluation is indicated in block B8. If R=1, a series of data movement operations is begun. These operations transfer data stored in the PCB to memory, beginning at an address specified in the PCB. This activity is represented in block B9a. If R=0, nothing occurs as indicated in block B9b. In either case, the processor is now ready for the next instruction as indicated by block B10.

Another means of carrying out a process switch operation is with a RETURN TO PROCESS instruction. The current process is terminated and a new process is initiated in the processor. Block B6 represents the initiation of this sequence. The operation includes obtaining a pointer (ISP) from the interrupt stack. It also includes copying the R bit of the new process into the R bit field of the PSW of the current process, as occurs in block B3. Blocks B7, B8, B9a and B9b take place as in the CALL PROCESS instruction. The PC, SP and PSW registers are loaded from the PCB in block B7, the R bit is tested in block B8 and a series of data movement operations may be invoked at B9a.

Next the R bit is again tested in block B11. If R=1, the user registers R0 through R10 are loaded from the PCB, as indicated in block B12a. If R=0, nothing occurs, as indicated in block B12b.

Finally, the processor is ready for the next instruction, as indicated in block B13.

A process interrupt occurring in response to an asynchronous external signal is initiated as represented by block B2. The operation in response to an interrupt signal is shown as dot-dash lines in FIG. 8 and can be seen to follow the sequence followed in response to a call process instruction. The R bit is particularly useful in interrupt operations. Interrupt operations never required more than steps 1 and 3. Yet all four were always provided. Particularly for interrupt operations where timing requirements are critical, the invention permits highly desired speed enhancement to be achieved.

FIGS. 9-32 depict general registers R0 through R10 of array 40 of FIG. 3. The PSW, PC, SP and ISP registers also reside on chip. The last four registers are always changed during a process switch operation. But the selective saving of user registers R0 through R10 reduces the amount of processor time used in setting up the registers for a new process as noted in step 3 above. The probability that the general purpose registers in a processor will have to be saved during any given process switch operation is 50 percent. If we assume that half of a process switch operation is consumed restoring (or saving) user registers, then 50 percent of the computer time could have been wasted in a process switch operation restoring (or saving) extraneous information. The savings noted above is seen to be considerable.

Figure 11:
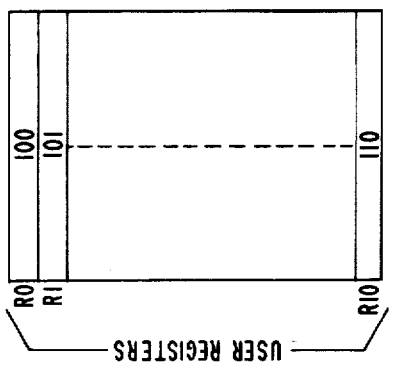
FIGS. 9-32 are block diagrams of memory sections and registers in the microprocessor of FIG. 1 showing data control therein during operation.
Figure 10:
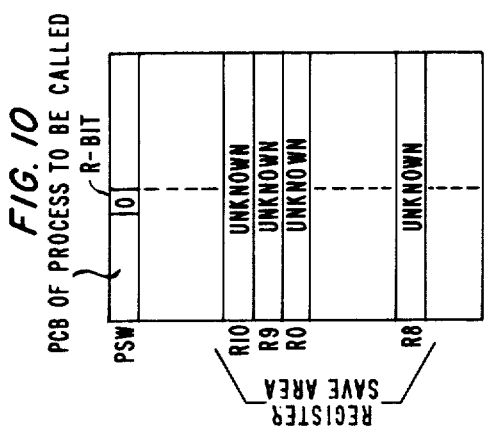
Figure 9:
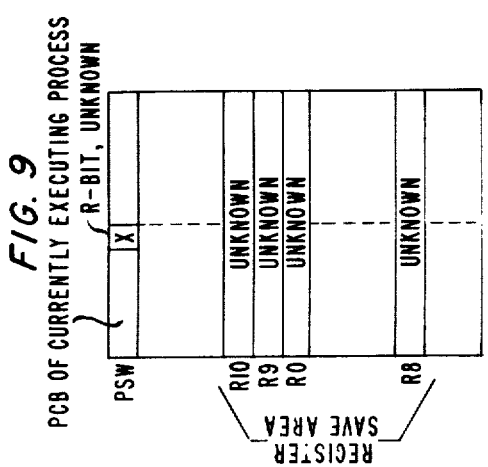

The operation is now described in terms of a portion of memory 72 in which an image of the registers is stored, a portion of the memory in which an image of the PSW register is stored, and a schematic of the user registers 40. Specifically, FIGS. 9, 10 and 11 show the initial state of the pertinent sections of memory and user registers. The registers are designated R0, R1 . . . R10, as shown in FIG. 11, with contents 100, 101 . . . 110. FIG. 9 designates the pertinent section of memory as the "register save area" arranged in the sequence $R_{10}$, $R_9$ and $R_0$ . . . $R_8$. This arrangement of the image sequence differs from the actual register sequence merely because of convenience. The pertinent section of memory in FIG. 9 also includes the image of the PSW register with an unknown R bit shown as an x. Note that the section of memory shown in FIG. 9 is labeled "PCB of currently executing process" which may, for example, correspond to PCB1 of memory 72 of FIG. 2.

FIG. 10 shows the pertinent section of memory which may correspond to PCB2 of memory 72 of FIG. 2. This section is assumed to store the "PCB of process to be called" as so labeled in the Figure. Note that the R bit of the called process is a zero.

Figure 14:
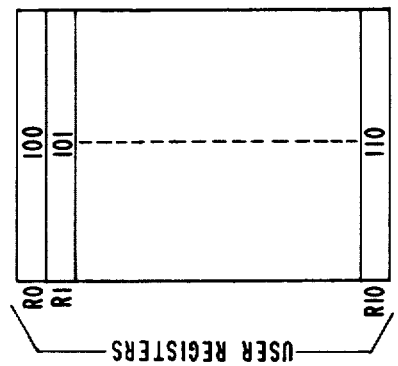
Figure 13:
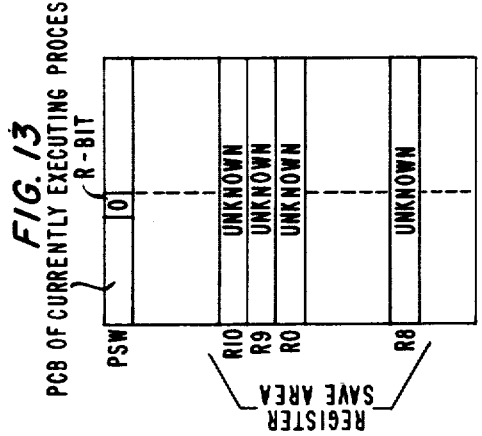
Figure 12:
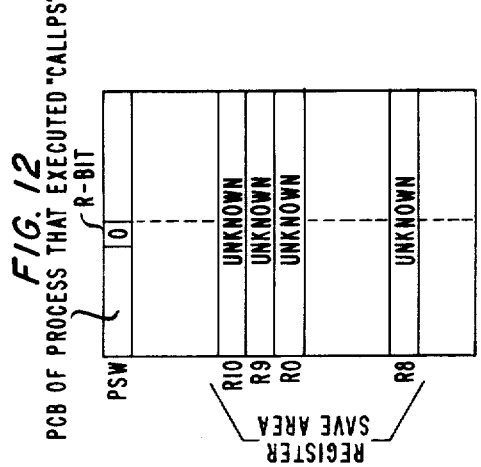

FIGS. 12, 13 and 14 represent the state of the microprocessor after the new process is called by executing a "call process" (CALLPS) instruction. FIG. 12 shows the PCB of the process tht executes the call. FIG. 13 represents the pertinent section of memory 72 in which the PCB of the currently executing process resides. Note that the R bit in the PSW of each process shown in FIGS. 12 and 13 is zero and the user registers remain unchanged as shown in FIG. 14.

Figure 17:
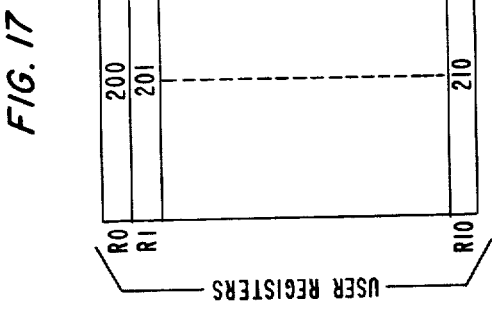
Figure 16:
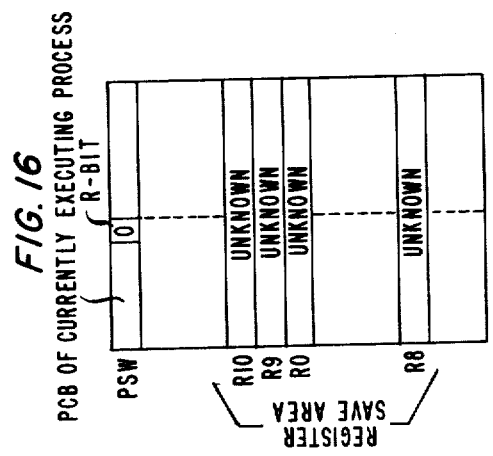
Figure 15:
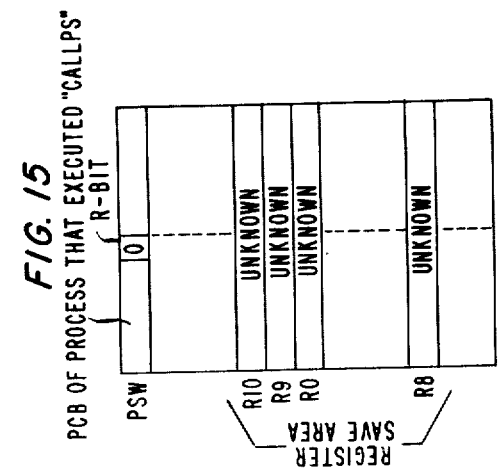

The state after the new process has executed is depicted by FIGS. 15, 16 and 17. The user registers are now changed (arbitrarily for illustrative purposes) as shown in FIG. 17. Note that since the R bits are zero the pertinent sections of memory 72 as shown in FIGS. 15 and 16 do not differ from the sections as shown in FIGS. 12 and 13.

Figure 20:
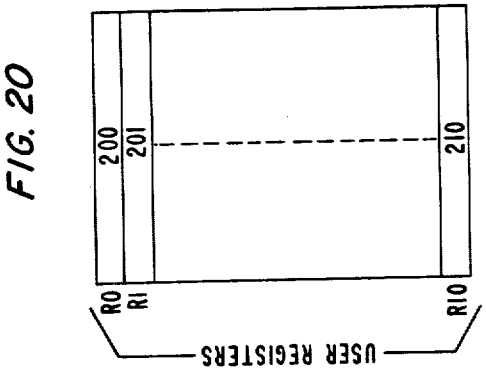
Figure 19:
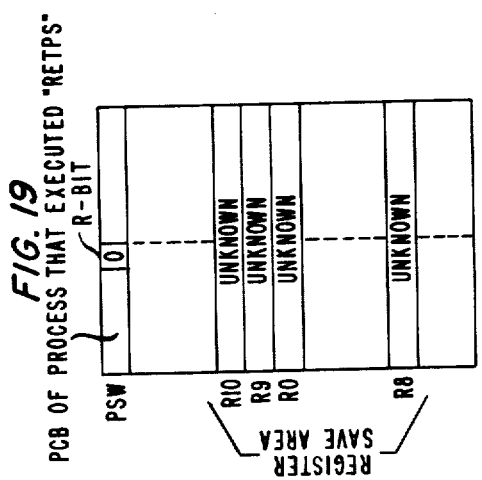
Figure 18:
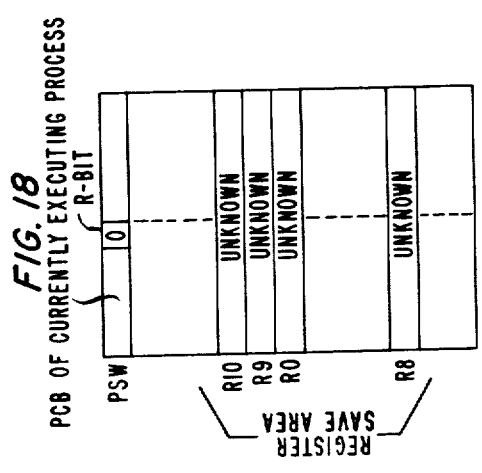

The state after the processor has returned to the original process by executing a "return to process (RETPS) instruction" in the new process is shown in FIGS. 18, 19 and 20. Note that the Figures are unchanged from FIGS. 15, 16 and 17 indicating that the state (except for the PC, SP and the PSW registers) after the new process has executed is the same as the state after the old process is "returned to process". Of course, a different result is orchestrated when the R bit of the called process is a binary 1.

Figure 23:
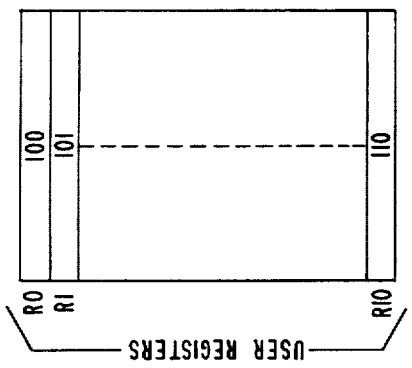
Figure 22:
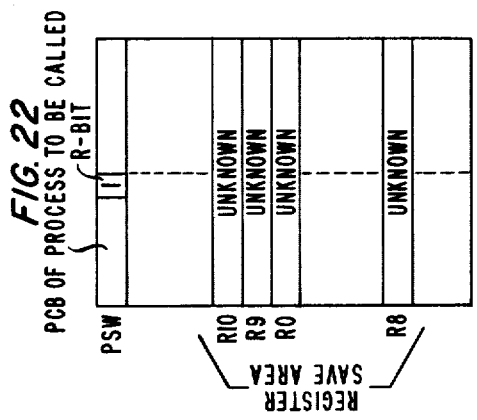
Figure 21:
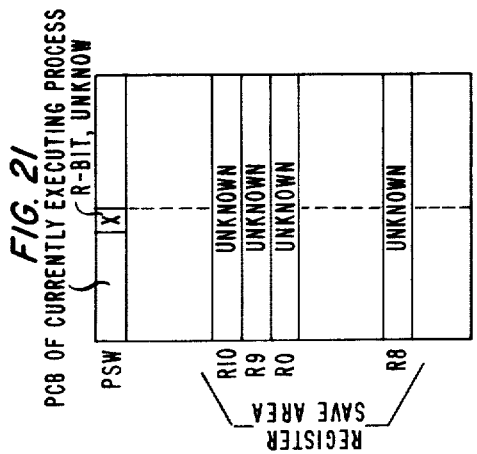

The initial state in the instance where the R bit of the new process equals 1 is shown in FIGS. 21, 22 and 23. The individual Figures are designated as were their counterparts in FIGS. 9, 10 and 11. Note that the R bit of the currently executing process as shown in FIG. 21 is unknown, whereas the R bit of the (new) process to be called is a binary 1 as shown in FIG. 22.

Figure 26:
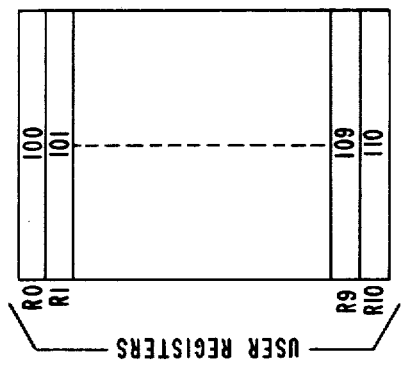
Figure 25:
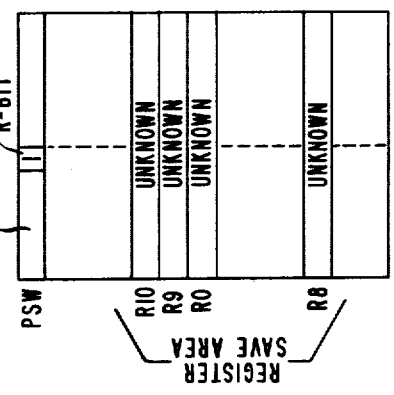
Figure 24:
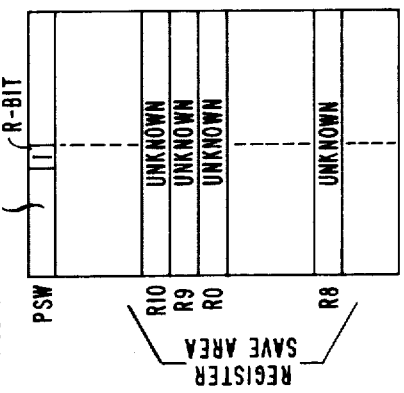
Figure 29:
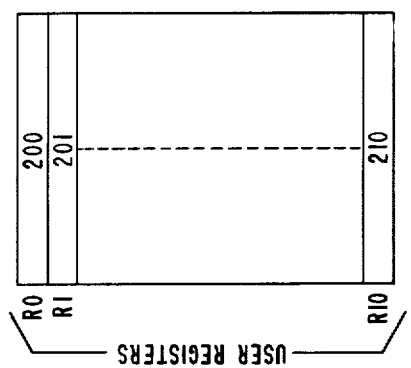

The state after the new process is called by executing a "call process" (CALLPS) instruction in the new process is depicted by FIGS. 24, 25 and 26. The PCB of each of the processes that executed the call process instruction (FIG. 24) and the current process (FIG. 25) is a binary 1 as shown. The registers at this juncture remain unchanged as is clear from a comparison of FIGS. 27, 28 and 29. Note that again the R bits in each of the PSW registers of the process that executed the call process instruction (FIG. 25) and the current process (FIG. 28) is a binary 1. But the contents of the user register are changed as is clear from a comparison of FIG. 29 with FIG. 26.

Figure 32:
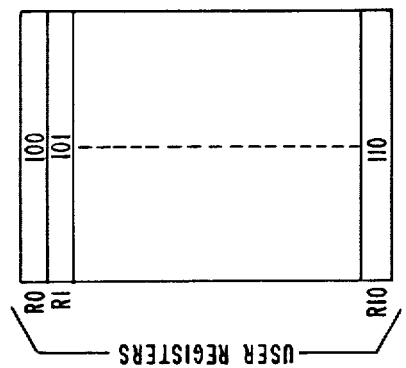
Figure 28:
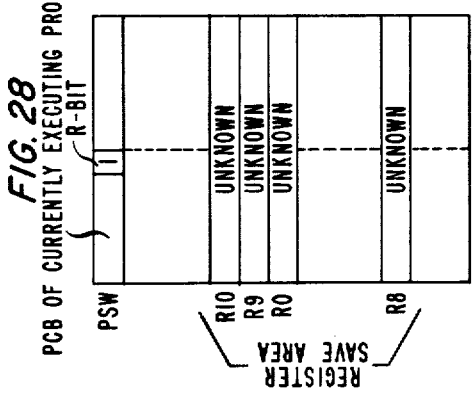
Figure 31:
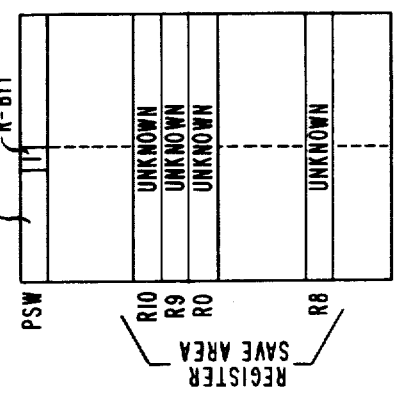
Figure 27:
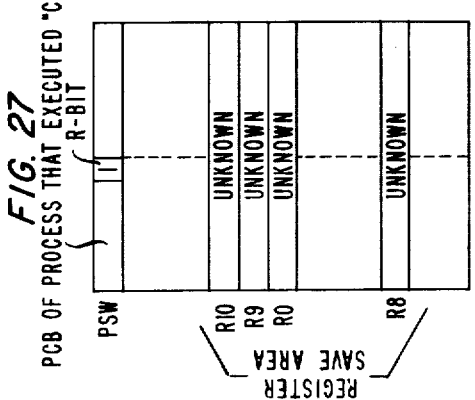
Figure 30:
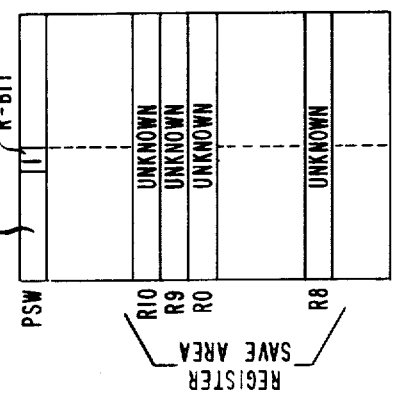

The state after the processor has returned to the original process by the execution of a return process (RETPS) instruction is depicted in FIGS. 30, 31 and 32. Note that the R bit in each of FIGS. 30 and 31 is a binary 1 and that the contents of the registers as shown in FIG. 32 are the same as was the case in the initial state (FIG. 23).

The call process operation is represented in FIG. 8 by solid line 400. The return to process operation is depicted by dotted line 401 originating at a block B5a representing an interrupt stack pointer.

The operation indicated in FIG. 8 and FIGS. 9–32 is implemented with special circuitry as shown in FIGS. 6 and 7 and with microcode stored in ROM. This special circuitry enables testing for the R bit to be done at a register rather than at a memory location. The related microcode would be, for example, 160 words long and 32 bits wide, addressed from PC register 45 under the control of access control PLA 13. An instruction to switch process includes, to this end, an instruction to branch to ROM followed immediately by an address applied to MPC by PLA 13.

In the absence of the special hardware of FIGS. 6 and 7, the microcode above is modified to test for the R bit out of memory. The program for this embodiment is shown with comments in Appendix B. The lines of code indicated by the notation #**#, are changed from the program of Appendix A to enable the processor to operate without the special hardware.

A single or multiuser processor arrangement with an advantageously fast process switch capability has now been described in terms of both a hardware implementation and a software implementation. What has been described is considered merely illustrative of the principles of the invention. Various modifications thereof can be devised by those skilled in the art in accordance with those principles within the spirit and scope of the following claims.

PRINTOUT APPENDIX A

```
In the following program, the following applies:

Instructions are of the form
        label: opcode operands
where the label is optional and there may be from 0 to 3 operands.
Constants are indicated by a "$", registers by a "%".
Registers surrounded by parentheses (e.g., (%r0) ) are used as
pointers, so the operand is fetched from memory.
If a number precedes a register surrounded by parenteses (e.g., 4(%r0) ),
that number is added to the contents of the register to form the
memory address.
All characters, up to the end of a line, following a "!" are treated
as a comment.

The following registers are used in the program:
%r0 through %r8         9 general purpose registers
%fp                     High-level language frame pointer, equivalent
                        to %r9.
%ap                     High-level language argument pointer,
                        equivalent to %r10.
%PSW                    Processor Status Word.
%pcbp                   Process Control Block Pointer.
%tma                    Temporary register a.
The following "registers" control special hardware:
%isc                    On writes, sets bits 0-6 of the PSW, which are
                        otherwise read-only.
%sts                    On writes, puts the value onto the status pins.
%kff                    On reads, forces the CPU into kernel mode.  On
                        writes, CPU mode taken from execution level
                        field of PSW.
%rPSW                   On writes, stores only the R-bit into the PSW.

The following instructions are used in the program:
This group of instructions sets condition codes, used by branch
instructions.
MOVW    operand1,operand2       Move data from operand1 to operand2
MOVAW   operand1,operand2       Move the address of operand1 to operand2
```

| | | |
|---|---|---|
| PMOVW | operand1,operand2 | MOVW, but permits entry to Macro-ROM. Restricted to privileged mode access. |
| ADDW2 | operand1,operand2 | Add operand1 to operand2 |
| SUBW2 | operand1,operand2 | Subtract operand1 from operand2 |
| ORW2 | operand1,operand2 | Logical OR of operand1 and operand2 |
| ANDW2 | operand1,operand2 | Logical AND of operand1 and operand2 |
| ANDW3 | operand1,operand2,operand3 | Logical AND of operand1 and operand2, stored in operand3. |
| BITW | operand1,operand2 | Logical AND of operand1 and operand2. Sets condition codes only. |
| CLRW | operand1 | Zero's operand1 |
| TSTW | operand1 | Reads operand1 and sets condition codes. |
| SPADD | operand1 | Adds operand1 to %r0 and %r1, adds %tma to %r2. |

This group of instructions does not set condition codes.

| | | |
|---|---|---|
| SAVE | operand1 | Used in high-level language procedure call linkage. Stores general registers in memory at the address pointed to by %sp. |
| RESTORE | operand1 | Inverse of SAVE, reads general registers from memory. |
| MEND | | Return from MACRO-ROM to user code. |
| MBSBH | operand1,opernad2 | Macro subroutine call. First operand is a 16-bit return address, next operand is a 16-bit subroutine address. |
| MRSB | | Macro return from subroutine. |
| MREQ | | Macro return from subroutine if equality condition holds in condition codes. |
| MBEQLH | operand1 | If equality condition holds, transfer to 16-bit address operand1. |
| MBNEQLH | operand1 | If equality condition does not hold, transfer to 16-bit address operand1. |

The following constants are used in the program:

| | |
|---|---|
| on_res_1 | Octal 010: sets ISC to condition corresponding to memory fault on accessing Interrupt Stack. |
| on_pcs_0 | Octal 001: sets ISC to condition corresponding to memory fault on accessing PCB during process switch. |
| xit_tm_0 | Octal 073: sets ISC to normal value during user program; isc=7, ft=normal, tm=0. |
| r_bit | Hex 0x100: bit position of R-bit in PSW. |
| ~r_bit | The 32-bit complement of r_bit |
| pcbfet | Hex 0x1: status pins value for PCB fetch. |

The program as it exists in the BELLMAC-32:
Boxes in the flow chart in Figure 8 are labeled.

```

#       CALLPS: Call Process, invoke a process switch to the process
#               whose PCB is pointed to by %r0

B1:
CALLPS: PMOVW   %r0,%tma      # tma <- new PCBP from r0
        TSTW    %kff          # force kernel mode on memory accesses
        MBSBH   q0,stkpc2     # call to 'stkpc2', which pushes the current
                              # value of the %pcbp onto the Interrupt Stack
q0:     MOVAW   2(%pc),4(%pcbp) # save address of next instr in PCB
        MBSBH   q1,B3         # save registers in current PCB, pcbp <- tma,
                              # and set psw, pc and sp from new PCB
q1:     MBSBH   B10,B8        # if r-bit set do block moves; return to 'end'

#  RETURN TO PROCESS  terminate current process, switch to process whose
#                     PCB is on top of the Interrupt Stack
```

```

B6:
RETPS:  PMOVW   %kff,%tma           # force kernel mode on memory accesses
        MOVW    &on_res_2,%isc
        MOVW    -4(%isp),%tma       # tma <- new PCBP from interrupt stack
        SUBW2   &4,%isp             # adjust isp to pop off new PCBP
        MOVW    &pcbfet,%sts
        MOVW    &on_pcs_0,%isc
        MOVW    (%tma),%rPSW        # r-bit in psw <- r-bit in new PSW
        MBSBH   h0,B7               # pcbp <- tma; set psw, pc and sp from new PCB
h0:     MBSBH   B11,B8              # if r-bit set do block moves in new PCB
B11:    BITW    &r_bit,%PSW         # test r-bit of new PSW
        MBEQLH  B13                 # if r-bit clear, skip reg-restore code
B12a:   MOVW    %sp,%ap             # these 5 lines restore ap, fp and r0-r8
        MOVAW   52(%pcbp),%fp       # by setting up sp, ap and fp,
        RESTORE %r0                 # doing a RESTORE that reads out of the PCB,
        MOVW    %ap,%sp             # and fixing up the sp
        MOVW    20(%pcbp),%ap       # and the ap.
B10:
B13:
        CLRW    %kff                # unforce kernel mode on memory accesses
        MOVW    &xit_tm0,%isc       # isc <- 7, ft <- normal, tm <- 0
        MEND

# Blocks B3, B4, B5a and B5b - save current registers in current PCB
# tma contains new PCBP

B3:     MOVW    (%tma),%rPSW        # r-bit in psw <- r-bit in new PSW
        MOVW    %PSW,(%pcbp)        # save psw in PCB MOVW    %sp,8(%pcbp)        # save sp in PCB
B4:     BITW    &r_bit,%PSW         # test r-bit
        MBEQLH  B7                  # if r-bit clear, skip register-save code
B5a:    MOVW    %ap,20(%pcbp)       # save ap in PCB
        MOVAW   24(%pcbp),%sp       # set sp so SAVE saves registers in PCB
        SAVE    %r0                 # save fp, r0-r8 in PCB
no need to restore %sp: B7 will do it for us
fall through to ...

# Block B7 - set pcbp from tma, and set psw, pc and sp from new PCB
# The code in this section has been omitted

B7:     # pcbp <- new PCBP
        # psw <- PSW from PCB (doesn't change r-bit)
        # pc <- PC from PCB
        # sp <- SP from PCB
            .
            .
            .
        MRSB

# Blocks B8, B9a, B9b - if r-bit of psw set, do block moves specified in PCB

B8:     BITW    &r_bit,%PSW         # test r-bit in psw
        MREQ                        # return if r-bit is clear
B9a:    MOVW    &-1,%tma            # value to be added to r2 each time
        MOVAW   72(%pcbp),%r0       # r0 points at 1st data word for 1st move
e1:     MOVW    -8(%r0),%r2         # r2 <- number of words to move
        MREQ                        # return if number of words to move == 0
        MOVW    -4(%r0),%r1         # r1 <- start address of block move
e2:     MOVW    (%r0),(%r1)         # move word from PCB (r0) to destination (r1)
        SPADD   &4                  # r0=r0+4, r1=r1+4, r2=r2+tma
        MBNEQLH e2                  # if count not zero, go back and move next word
        ADDW2   &8,%r0              # move r0 past length/addr of next move
        MBRH    e1                  # go back to start next block move

```

PRINTOUT APPENDIX B

If the R-bit hardware did not exist, then the following code would
have to be used. The changed lines are indicated with "#**#".
In addition, the R-bit field of the PSW would have to be made writable.
In the present design, it is read-only and can only be written with the Berenbaum - Jagannathan - Molinelli-
Pekarich                       1-1-1-1
special hardware.

```

#      CALLPS:   Call Process, invoke a process switch to the process
#                whose PCB is pointed to by %r0

B1:
CALLPS: PMOVW    %r0,%tma         # tma <- new PCBP from r0
        TSTW     %kff             # force kernel mode on memory accesses
        MBSBH    q0,stkpc2        # call to 'stkpc2', which pushes the current
                                  # value of the %pcbp onto the Interrupt Stack
q0:     MOVAW    2(%pc),4(%pcbp)  # save address of next instr in PCB
        MBSBH    q1,B3            # save registers in current PCB, pcbp <- tma,
                                  # and set psw, pc and sp from new PCB
q1:     MBSBH    B10,B8           # if r-bit set do block moves; return to 'end'

# RETURN TO PROCESS   terminate current process, switch to process whose
#                     PCB is on top of the Interrupt Stack

B6:
RETPS:  PMOVW    %kff,%tma        # force kernel mode on memory accesses
        MOVW     &on_res_2,%isc
        MOVW     -4(%isp),%tma    # tma <- new PCBP from interrupt stack
        SUBW2    &4,%isp          # adjust isp to pop off new PCBP
        MOVW     &ccbfet,%sts
        MOVW     &on_pcs_0,%isc
        ANDW3    (%tma),&r_bit,(%pcbp)         #**#
                                  # put incoming value of R-bit in a temporary
                                  # location. Memory location must be used
                                  # since there are no available registers.
        ANDW2    &~r_bit,%PSW                  #**#
                                  # clear R-bit position in psw
        OR2      (%pcbp),%PSW                  #**#
                                  # set r-bit in psw from saved temporary
        MBSBH    h0,B7            # pcbp <- tma; set psw, pc and sp from new PCB
h0:     MBSBH    B11,B8           # if r-bit set do block moves in new PCB
B11:    BITW     &r_bit,%PSW      # test r-bit of new PSW
        MBEQLH   B13              # if r-bit clear, skip reg-restore code
B12a:   MOVW     %sp,%ap          # these 5 lines restore ap, fp and r0-r8
        MOVAW    52(%pcbp),%fp    # by setting up sp, ap and fp,
        RESTORE  %r0              # doing a RESTORE that reads out of the PCB,
        MOVW     %ap,%sp          # and fixing up the sp
        MOVW     20(%pcbp),%ap    # and the ap.
B10:
B13:
```

Berenbaum - Jagannathan - Molinelli-
Pekarich                       1-1-1-1

```
        CLRW     %kff             # unforce kernel mode on memory accesses
        MOVW     &xit_tm0,%isc    # isc <- 7, ft <- normal, tm <- 0
        MEND

# Blocks B3, B4, B5a and B5b  -  save current registers in current PCB
# tma contains new PCBP

B3:     ANDW3    (%tma),&r_bit,(%pcbp)         #**#
                                  # put incoming value of R-bit in a temporary
                                  # location. Memory location must be used
                                  # since there are no available registers.
        ANDW2    &~r_bit,%PSW                  #**#
                                  # clear R-bit position in psw
        OR2      (%pcbp),%PSW                  #**#
```

```
                MOVW    %PSW,(%pcbp)        # set R-bit in psw from saved temporary
                MOVW    %sp,8(%pcbp)        # save psw in PCB
                                            # save sp in PCB
B4:             BITW    &r_bit,%PSW         # test r-bit
                MBEQLB  B7                  # if r-bit clear, skip register-save code
B5a:            MOVW    %ap,20(%pcbp)       # save ap in PCB
                MOVAW   24(%pcbp),%sp       # set sp so SAVE saves registers in PCB
                SAVE    %r0                 # save fp, r0-r8 in PCB
no need to restore %sp: B7 will do it for us
fall through to ...

#   Block B7  -  set pcbp from tma, and set psw, pc and sp from new PCB
#   The code in this section has been omitted

B7:             # pcbp <- new PCBP
                # psw <- PSW from PCB (doesn't change r-bit)
                # pc <- PC from PCB
                # sp <- SP from PCB
                    .
                    .
                    .
                MRSB

#   Blocks B8, B9a, B9b  -  if r-bit of psw set, do block moves specified in PCB

B8:             BITW    &r_bit,%PSW         # test r-bit in psw
                MREQ                        # return if r-bit is clear Berenbaum - Jagannathan - Molinelli-
Pekarich                                    1-1-1-1
B9a:            MOVW    &-1,%tma            # value to be added to r2 each time
                MOVAW   72(%pcbp),%r0       # r0 points at 1st data word for 1st move
e1:             MOVW    -8(%r0),%r2         # r2 <- number of words to move
                MREQ                        # return if number of words to move == 0
                MOVW    -4(%r0),%r1         # r1 <- start address of block move
e2:             MOVW    (%r0),(%r1)         # move word from PCB (r0) to destination (r1)
                SPADD   &4                  # r0=r0+4, r1=r1+4, r2=r2+tma
                MBNEQLB e2                  # if count not zero, go back and move next word
                ADDW2   &8,%r0              # move r0 past length/addr of next move
                MBRH    e1                  # go back to start next block move

Berenbaum - Jagannathan - Molinelli-
Pekarich                                    1-1-1-1
```

What is claimed is:

1. A microprocessor arrangement including a semiconductor integrated circuit chip, said chip comprising a first register array adapted to store the hardware context of a current process and a second register array for storing the instantaneous data being processed by said microprocessor during the execution of said current process, said first register array including a first register containing a first bit having first or second values and means responsive to said first or second values for controllably storing the contents of said first and second register arrays or the contents of only said first array, respectively, during a process switch operation.

2. A microprocessor arrangement in accordance with claim 1 also including memory means for storing a plurality of processes therein along with the associated hardware contexts for each of those processes.

3. A microprocessor in accordance with claim 1 also including a read only memory, said memory having stored therein a program operative to store the contents of said second register array, and means responsive to said first bit for selectively executing said program.

4. A system for increasing the speed at which processes are switched in a microprocessor, said system comprising a microprocessor for executing any selected one of a plurality of processes, said microprocessor including a register array for storing data used in the execution of a current process, said system also comprising a user memory, said memory comprising address space for instructions and data associated with each of said plurality of processes, each of said address spaces including an associated process control block containing a first R bit, said microprocessor including a register containing a second R bit, said system also including means responsive to said second and first R bits for storing the contents of said register array in said user memory in the process control block of said current process and for storing the contents of the process control block of a newly selected process in said register array respectively when a process switch operation occurs.

5. A system for increasing the speed at which processes are switched in a microprocessor, said system comprising a memory including a plurality of process spaces in each of which associated data and instructions are stored for a specified process, each of said spaces also including a process control block storing the associated initial state of a program counter, a stack pointer, a processor status word, and a register array in a microprocessor adapted to execute any selected one of said processes, said microprocessor including said program counter, said stack pointer, said processor status word and said register array, the latter being adapted to store data during the instantaneous operation of said processor, means for switching processes from a current to a next consecutive process during a process switch operation, said system being characterized in that said processor status word register and said process control block of a newly selected process include first and second R bits, respectively, and means responsive to said first and second R bits for determining whether or not the contents of said register array are stored in the process control block of the current process and whether or not the register array is initialized by the contents of the processor control block of a newly selected process when a process switch operation occurs.

* * * * *